2,891,690
FILM FRAMING AND INDEXING DEVICE

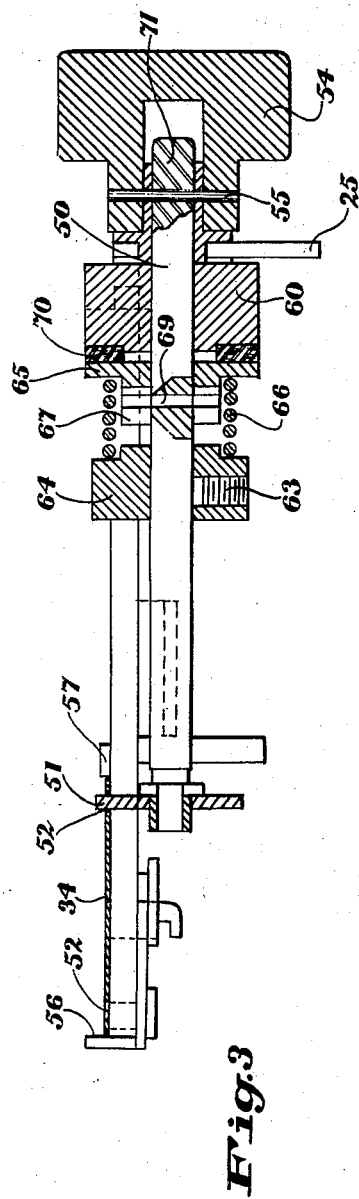
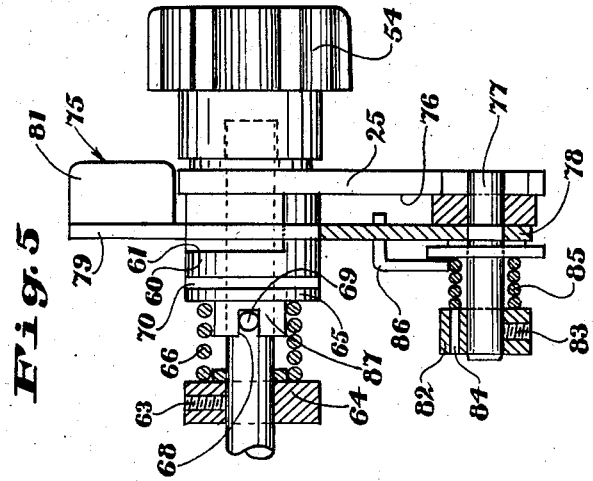
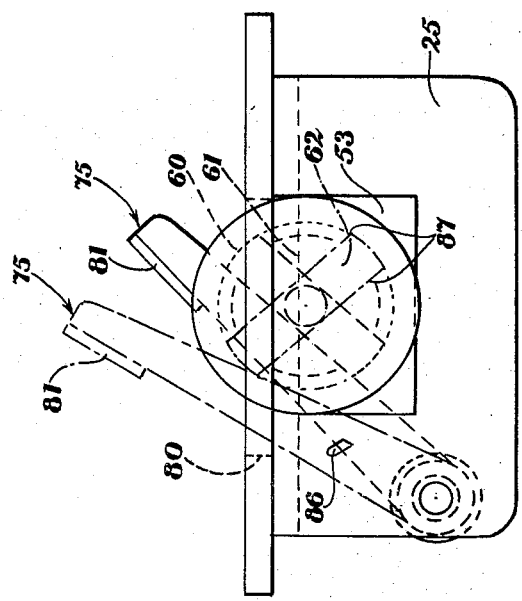
Henry N. Fairbanks
INVENTOR.

Henry N. Fairbanks, Rochester, N.Y., assignor to Eastman Kodak Company, Rochester, N.Y., a corporation of New Jersey Application September 9, 1957, Serial No. 682,890

11 Claims. (Cl. 216—29)

The present invention relates to a film mounting apparatus, and more particularly to a device for severing stereo images or transparencies from a film strip, and mounting the individual images on a mount in proper aligned and stereo relation.

As is well known, stereo transparencies are formed by making simultaneously a pair of exposures with a double lens camera, the lenses of which are spaced a definite distance apart. Due to the spacing of the camera lenses, the two images forming a stereo pair are not adjacent, but are spaced along the film strip. The various film strips may be processed individually or, as is common practice, they are connected and wound into a large roll and processed as a group. After processing, the film strip either separate or in a roll, is fed along a film guide to the severing mechanism which severs the individual stereo images or transparencies from the strip. These individual transparencies are arranged in proper aligned and stereo relation in a double-aperture mount. The latter is of well known construction and may be formed from a single sheet of cardboard which is folded along the center line and provided with a pair of aligned apertures with which the pair of stereo images or transparencies are registered, as is well known.

The present invention provides what may be termed a semi-automatic device for mounting the individual transparencies in proper relation on the stereo mount. The mount is positioned on a multi-faced platen which is mounted for both rotation and axial movement. Due to the unique arrangement of the image areas of a pair of stereo transparencies, after one of the pair has been mounted the platen must be adjusted to bring the proper mount and the proper aperture thereof into position to receive its image area. To secure this result, the platen is rotated and adjusted axially to bring the proper mount and the proper aperture into alignment with the film strip so as to be in position to receive the severed image area. The film strip is moved along a film track or guide which is carried by a pivoted plate which is rockable about a pivot, as will be later pointed out. This pivoted plate carries the severing means and the tacking means. While the platen, film track, and severing means, as well as the tacking means, may be of any suitable design, in the present embodiment they are substantially identical to those shown and described in applicant's copending application Serial No. 583,003, filed May 7, 1956, Patent Number 2,852,153, issued Sept. 16, 1958, to which reference may be had for a detailed description.

The structure of the present invention relates to a new and improved means for feeding the film strip and for framing the first image area of the strip relative to the positioned mount which is arranged to receive the first image area or transparency. Also, the present invention provides a novel arrangement for indexing or moving the film a definite distance, one image area, to bring successive image areas progressively into proper mounting relation with the stereo mount. This indexing means clearly and automatically indicates to the operator when the film has been indexed or mounted the desired distance of one image area, so the latter is now in position for severing and tacking over the positioned area of the mount. In addition, the present invention provides a new, simple and highly effective device for accurately and properly phasing the indexing means during the initial framing operation so as to insure that each subsequent indexing operation will not only move the film the proper distance; but, also, will bring the next image area into proper relation with the mount, the advantages of which are deemed apparent.

The present invention has as its principal object the provision of a new and improved indexing means for a stereo mounting device.

Another object of the invention is the provision of an arrangement for phasing the indexing means relative to a framed film strip to insure proper feeding and positioning of the various stereo images of the strip.

Yet another object of the invention is the provision of an indexing device which readily and automatically indicates to the operator when the film strip has been moved the required distance to bring the next transparency into proper relation with its receiving mount.

Still another object of the invention is the provision of a phaseable means which, after the film strip is initially framed, will automatically move subsequent film areas the proper amount and in proper framing relation.

And yet another object of the invention is the provision of a phaseable indexing member which is simple in design, rugged in construction, comprises few parts, easy to operate, and highly effective in its result.

To these and other ends, the invention resides in certain improvements and combinations of parts, all as will be hereinafter more fully described, the novel features being pointed out in the claims at the end of the specification.

In the drawings:

Fig. 3 is a side elevation view of the indexing mechanism of the present invention, with parts in section;

Fig. 4 is an end view of the indexing mechanism showing the relation of the indexing cam and the phasing mechanism; and Fig. 5 is a side elevation view taken from the left of Fig. 4, with parts in section and showing some of the details of the indexing and phasing device.

Similar reference numerals throughout the various views indicate the same parts.

Figure 1:
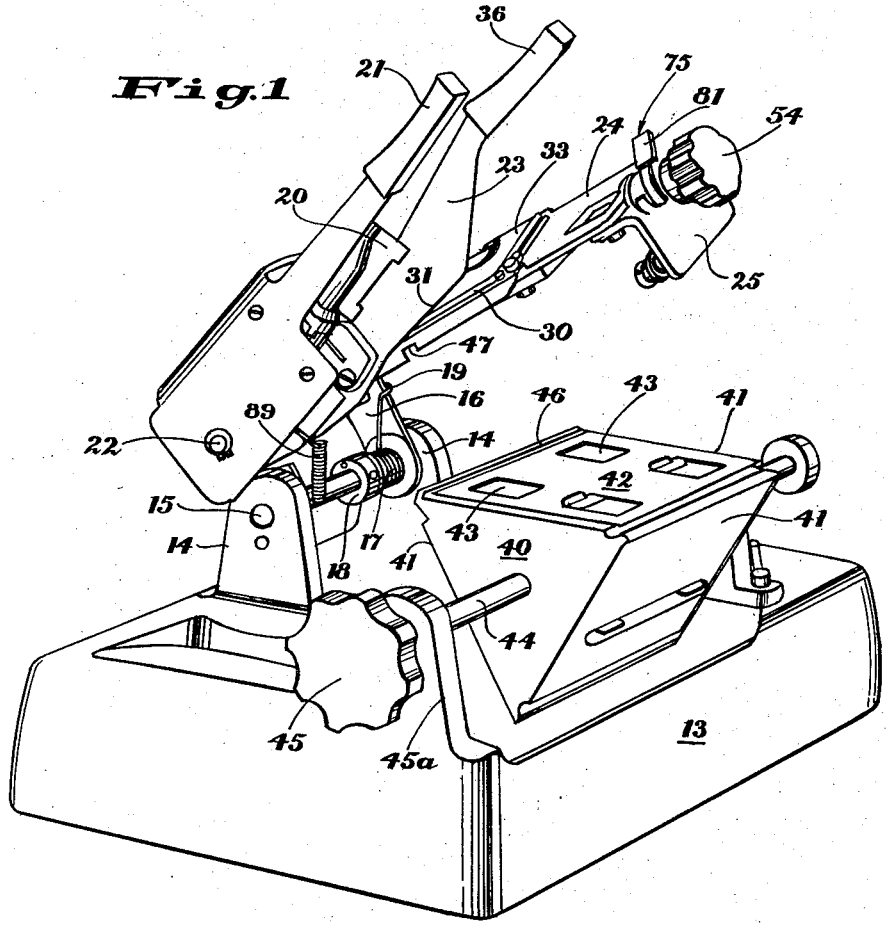
Fig. 1 is a perspective view of a stereo mounting device, showing the relation thereto of an indexing device constructed in accordance with the present invention.

The device of the present invention comprises a main base or support 13 to which is secured or formed integral therewith, a pair of upstanding members 14 which carry a pivot shaft 15 for a rockable bracket, generally indicated by the numeral 16. A coil spring 17 has one end anchored to a collar 18 secured to shaft 15, and the other end 19 engages an arm of the bracket 16 and tends to rock the latter and its associated parts in a counterclockwise direction to its upper or inoperative position as shown in Fig. 1. The bracket 16 carries a heating coil, not shown, which is connected to a tacker element 20 which is arranged in depending relation from the tacker arm 21 which is rockable about a shaft 22 carried by bracket 16, see Fig. 1. A knife arm 23 is also rockable about the pivot shaft 22. The operation of the knife and tacker will be later described.

The bracket 16 has secured thereto or formed integral therewith a plate 24 the free end of which has a turned down end 25. This end may, of course, be a separate angle plate secured to the plate 24, if desired. The plate 24 has an edge 30 which constitutes a stationary knife edge which cooperates with the movable knife edge 31 on arm 23 to sever the film strip, as will be later described. The top face of the plate 24 is provided with a film guide, generally indicated by the numeral 33, along with a film strip 34 is moved, by means to be later described, to bring successive frame lines 35, between the image areas, into registry with the edge 30 to frame the image area. When the plate 24 is lowered, as will be later described, the arm 36 of the knife 23 may also be lowered to sever the film along a frame line 35 to separate a transparency from the film strip, as is deemed apparent.

In order to mount the individual image areas or transparencies of the strip 34, a rotatable platen 40 is provided, and this platen has a plurality of mounting stations 41, in the present instance 3. In other words the platen 40 is triangular in shape, each side 41 of which provides a mounting station. Each side or station has mounted thereon a flat plate of the type shown at 52, Fig. 2, of the above-mentioned Fairbanks application. Each of these plates has positioned thereon a stereo mount 42 of well-known construction formed with a pair of aligned apertures 43 with which the pair of stereo transparencies is placed in registry, in the manner clearly set forth in the above-mentioned Fairbanks application.

This triangular platen 40 is carried by a shaft 44 which is rotatable and axially slidable in bearing brackets 45a which extend upward from the base 13, as shown in Fig. 1. One end of the shaft 44 is provided with a knob 45 by which the shaft 44, and hence platen 40, may be rotated to bring the desired station 41 to upper horizontal position, as shown in Fig. 1, to mount the transparencies over the apertures 43 of the mount 42. Also, knob 45 may be used to slide the shaft 44, and hence platen 40, axially to bring the proper aperture 43 in film receiving position. The operation of the platen and the sequence of the transparency mounting is fully explained in the above-mentioned Fairbanks application to which reference may be had. As these features do not form a part of the present invention, further details are not deemed necessary herein.

Suffice it to say, that the knob 45 will rotate and shift the platen axially to bring the proper aperture 43 adjacent the stationary knife edge 30 to receive a transparency which is severed from the filmstrip 34. After the platen has been thus positioned, the plate 24 with the knife 23 and tacker 21 are moved clockwise about shaft 15 to position the plate, knife and tacker adjacent the platen. With the parts in this position, the film strip 34 is fed along guide 33 by means to be later described, and the transparency is separated from the strip and positioned over the mounted aperture. The parts so far described are very similar to and operate in substantially the same manner as the device illustrated and described in the aforementioned Fairbanks case.

The present application differs slightly from this prior Fairbanks device in that a new arrangement is provided to hold the platen in adjusted position. To this end the left edge of each station 41 is provided with an upstanding rib or ridge 46 which is adapted to receive in a registering notch 47 on the lower side of the plate 24 when the latter is lowered to its operating position. When the rib 46 is positioned in notch 47, platen 40 is held against rotation when the knife and tacker are operated or lowered, as is deemed apparent.

In addition, the present invention provides a new and improved film feeding means which not only frames the first image area of a strip, but also accurately feeds each successive image area the exact amount to bring such successive areas into position with the frame line 35 thereof and in precise registry with the stationary knife edge 30. Thus, the film is moved the exact amount without requiring any particular attention on the part of the operator. Means is provided in connection with the moving means to indicate to the operator when the winding operation has been completed and the film moved the exact distance required. Also, means is provided for phasing the indexing means so the indexing means is in a definite relation with the film strip, so that when the winding means is operated the film strip will not only be moved the proper distance, but will also be accurately positioned or framed, with the frame line in registry with the knife edges 30 and 31 so that when the knife 23 is actuated, the image area will be severed along the frame line 35 only, the advantages of which are deemed apparent.

To secure this result, a drive shaft 50 is suitably supported in suspended relation on the under side of plate 24 and has secured to one end thereof a drive sprocket 51 which is positioned to engage the perforations 52 of the film strip to move the latter through the film guide 33 toward a mount 42 positioned on the platen 40, as is deemed apparent from Fig. 1. The other end of shaft 50 extends through an opening 53 in plate 25 and has mounted thereon an actuating knob 54 which is secured to shaft 50 by means of a pin 55. Thus, as the knob 54 is rotated the shaft 50 and sprocket 51 rotate as a unit to move the film strip through a film gate or guide 33. Of course, the complete film movement and framing can be obtained solely by the control of the movement of shaft 50 by the operator. However, such an arrangement would require the undivided attention of the operator in order to be sure the shaft and sprocket have been rotated the proper amount to move the film strip the exact distance of one image area. Also, the shaft and sprocket movement must be such as to position the image area with a frame line 35 in exact registry with the knife 30. The disadvantages of such control are deemed obvious. The film during the movement of the sprocket is guided between a movable edge guide 56 and a stationary guide 57, Fig. 3. As these guides are of well known construction, and form no part of the present invention, details are not necessary.

In order to overcome the above-mentioned disadvantages, the present invention provides a control means to indicate to the operator, by the sense of feel, that the film has been moved the proper distance. In addition, this control means is phased properly with relation to the film strip so that when the shaft and sprocket have been moved the proper distance, as indicated by the control means, the film also will be positioned with the frame line 35 in exact registry with the knife edge 30.

To secure this result, a cam clutch member 60 is loosely mounted on shaft 50 and has formed on one face 61 thereof a lug or cam member 62 having a pair of parallel flat faces 87, as best shown in Fig. 4. The shaft 50 also has secured thereto, by means of a set screw 63, a pressure regulator collar 64. A pressure clutch plate 65 is spaced axially, to the right in Fig. 5, from the collar 64, and is connected thereto by means of a coil spring 66. The plate 65 is formed with an axially extending flange 67 which is provided with a slot 68 adapted to receive a pin 69 carried by shaft 50 to spline the plate 65 on shaft 50 for rotatable movement therewith but axially relative thereto, as is deemed apparent. A friction clutch plate 70 is positioned between the pressure clutch plate 65 and the cam clutch member 60 to connect the latter releasably to plate 65, and hence to shaft 50, so that rotation of the latter will rotate the member 60 and the cam 62 as a unit with shaft 50. The spring 66 presses the member 60 and cam 62 against the sleeve 71 which carries knob 54, as seen from Fig. 3. Thus, the cam clutch member 60 and cam 62 are yieldably held between the plate 65 and sleeve 54, yet are releasably connected to the shaft 50 for rotation as a unit therewith, or selectively disengageable therefrom, the purpose of which will be later described.

Figure 2:
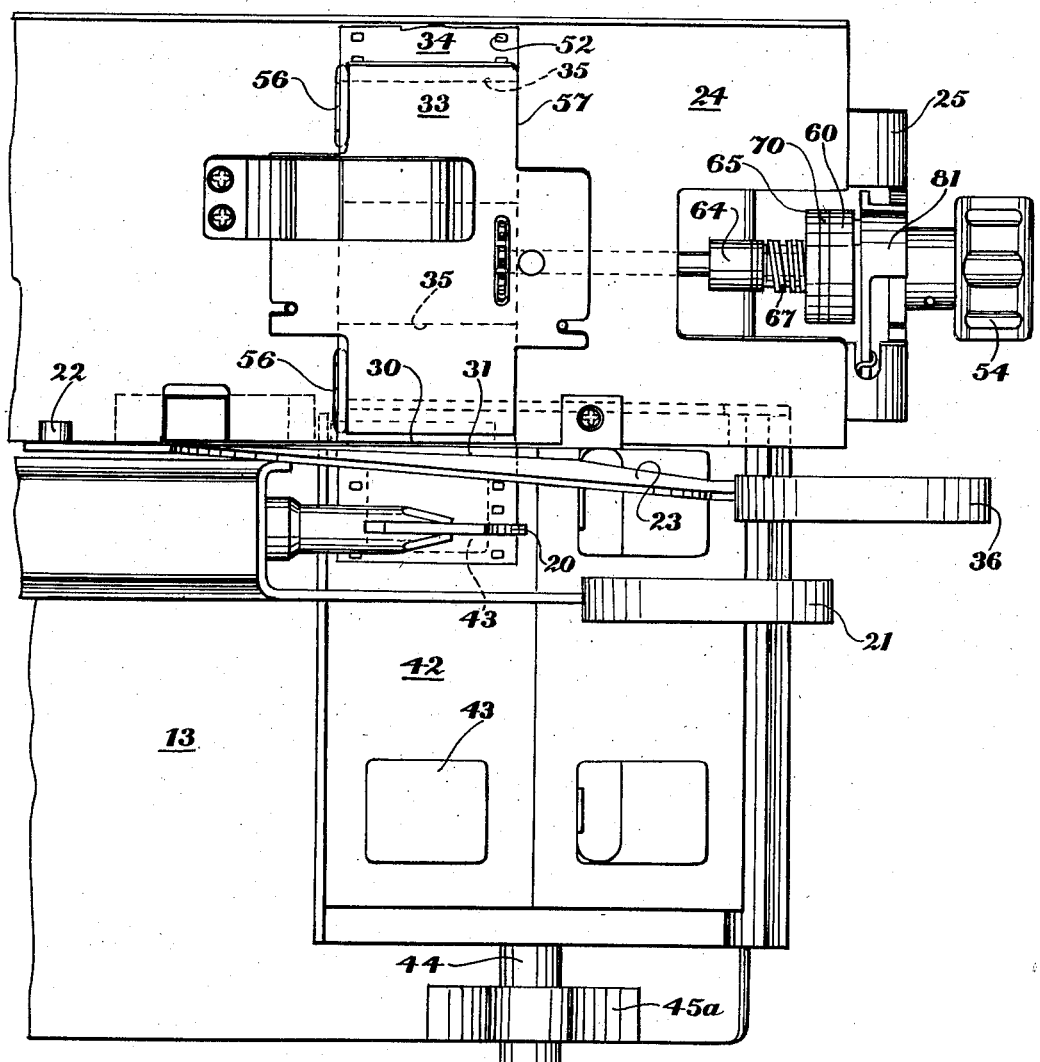
Fig. 2 is a plan view of the device illustrated in Fig. 1, but on a larger scale than the latter, showing more fully the indexing mechanism of the present invention.

In order to control and indicate the movement of the film strip so that the operator can readily ascertain when the film strip has moved its exact distance to position the image area or transparency for severing, the present invention provides an indicator lever 75 which is rockably mounted on plate 25 and positioned to engage the cam 62 yieldably. To this end, the inner surface 76 of plate 25 has mounted thereon an inwardly projecting pin or stud 77 on which is mounted a lower end 78 of lever 75, the upper end 79 of which lies in contact with one of the faces 87 of the cam 62, as best shown in Fig. 4. The end 78 of lever 75 extends upward through a registering opening 80 in plate 24, and terminates in a finger operating portion 81, as shown in Fig. 2. A torsion regulator collar 82 is adjustably secured to pin 77 by a set screw 83 and has secured thereto one end of a coil spring 85, the other end 86 of which engages lever 75 and tends to rock the latter clockwise, as shown in Fig. 4, to hold lever 75 in yieldable engagement with a cam face 62. By rotating the collar 82 the tension of spring 85 may be adjusted, as is deemed apparent.

The parts are so designed that shaft 50 and sprocket 51, as well as cam 62, will make exactly one-half revolution to move the film strip the distance of one image area. During such rotation, the cam 62 will move from the dotted position in Fig. 4 to the broken line position lifting lever 75, and then back to the dotted position. In the latter position the lever snaps against a face 87 of the cam 62 and indicates to the operator, by the sense of feel, that the shaft has been rotated an amount sufficient to shift the film strip the distance of one image area. Thus, the cam 62 and the spring pressed lever 75 provide means to indicate the movement of the film and thus provide, in effect, a control means for the film to control the extent of movement thereof so as to position the film properly. Thus, each time the shaft and sprocket are rotated one-half revolution, the film has been properly moved to bring the next image area into registry with the aperture of the mount at which time the lever 75 will then contact the face 61 of the cam 62.

The present invention thus provides means for controlling movement of the film strip, and also indicates to the operator that the movement has been completed. However, in order that a cam 62 and lever 65 may be effective in controlling the film movement, it is imperative that the cam 62 be phased relative to the film strip. In other words, the cam 62 must be so adjusted relative to the shaft 50 and sprocket 51, that when the film strip has been moved to position a frame line 35 in registry with knife edge 30, the lever 75 will contact a face 87 of cam 62, as shown in the dotted line position, Fig. 4.

To secure this result, the cam clutch member 60 with its cam 62 is loosely mounted on shaft 50 and is releasably connected thereto through a friction plate 70, plate 65, spring 66 and collar 64 all as is deemed apparent from an inspection of Fig. 3. Thus, the cam clutch member 60, and cam 62 may be clutched to shaft 50 for rotation as a unit therewith, while the member 60 and cam 62 may be declutched from shaft 50 to permit independent rotation of the latter.

With the above arrangement, the film strip is fed through a guide 33 to bring the first frame line 35 into registry with the stationary knife 30 to frame the first image area. However, during this initial film movement and framing operation, the operator presses against the finger piece 81 to hold the latter in tight engagement with a face 87 of cam 62 to retain the cam 62 in dotted line position shown in Fig. 4. The cam 62 is then held stationary while the shaft 50 and sprocket 51 are rotated relative to the cam to move the film strip until the first frame line 35 finally registers with the knife edge 30. Thus, during this initial framing operation the shaft 50 and sprocket 51 are rotated relative to the member 60 and cam 62, and the latter is disconnected from the shaft 50. However, at the end of the initial framing operation the finger piece 81 is released, and the cam 62 then becomes connected to the shaft 50 and sprocket 51 in proper accurately phased relation with the film strip. Thus, this phasing is accomplished during the initial framing operation, and is essential to the proper subsequent operation of the device.

Thus, the present invention provides a simple and effective means for phasing the control means for the film strip. Now, after the initial phasing operation, the operator releases the finger piece 81, and lever 75 is held against the cam face solely by action of spring 85, and the cam 62 is again connected or clutched to the shaft 50 for unitary rotation therewith. Now, when the shaft 50 and sprocket 51 are rotated to shift the film, the cam clutch member 60 and cam 62 rotate as a unit with the shaft and sprocket. However, when the film has been moved exactly the distance of one image area, and the next frame line 35 has been moved into registry with knife 30, the cam 62 and indexing lever 75 finally arrive at the dotted line position illustrated in Fig. 4 to indicate to the operator, by the sense of feel, that the film has been moved the proper distance and the next image area is properly framed. The knife lever 36 is then pressed down over the film image area to sever the image area to separate the image area from the strip along the trailing frame line of the image area. The tacker arm 21 is also depressed to bring the tacker 20 into contact with the severed film area to heat-tack the area in position over the proper mount aperture. Thereupon the tacker area 21 is released and the spring, not shown, moves the latter upward relative to plate 24, and the knife fingerpiece 36 is released and the knife elevated by means of a small coil spring 89 which connects the knife 23 with one of the rear supports 14, as best shown in Fig. 1. After the release of the knife and tacker, the operator then releases the knob 54, and the plate 24, and its associated parts, swing counterclockwise about shaft 15 under the action of spring 17 to its upper or inoperative position as shown in Fig. 1. The platen 40 may now be rotated and/or slid axially by means of knob 45 and shaft 44 to properly position a platen station 41 in position to receive the next image area or transparency.

The present invention thus provides a new and improved mechanism for framing the first image area of the film strip. This moving and framing of each successive image area automatically indicates to the operator that the strip has been moved the proper amount to frame the next image area. Also, the indexing means is phased accurately relative to the film strip so that by each movement of the film strip the image area is properly positioned or framed so that when the knife is operated the image area will be severed along a frame line, the advantages of which are deemed apparent. The structure for securing these results is simple, rugged, easy to operate and accurate in its results.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising means cooperating with said feeding means to frame a transparency of said strip relative to said mount, means to index said strip to bring successive transparencies into position relative to said mount, and means to phase said indexing means relative to said feeding means whereby each succeeding transparency is properly positioned for severing and mounting.

2. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising means to move said feeding means to move said strip to frame a transparency thereof relative to said mount, an indexing member, means to connect said indexing member in driven relation to said feeding means, and means to release said indexing means from said feeding means during said framing to phase said indexing member with said feeding means.

3. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising means to move said feeding means to move said strip to frame a transparency thereof relative to said mount, an indexing member carried by said feeding means, means to connect said indexing member in driven relation to said feeding means, and means movable into engagement with said indexing member to hold the latter against movement during the movement of said feeding means while framing to phase said indexing member with said feeding means.

4. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising means to move said feeding means to move said strip to frame a transparency thereof relative to said mount, an indexing cam carried by said feeding means, clutch means to connect said cam releasably to said feeding means, and means to hold said cam against movement during the framing to phase said cam with said film strip.

5. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising means to move said feeding means to move said strip to frame a transparency thereof relative to said mount, an indexing cam carried by said feeding means, clutch means to connect said cam in driven relation to said feeding means, means carried by said support and movable into engagement with said cam to disconnect said clutch to retain the cam stationary during framing to phase said cam with said film strip so that subsequent operations of said feeding means will enable said cam to indicate the proper feeding of the film.

6. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising means to move said feeding means to move said strip to frame a transparency thereof relative to said mount, an indexing member loosely mounted on said feeding means, clutch means to connect said cam in driven relation to said feeding means, and means carried by said support and engaging said cam to indicate the proper indexing of said film, said last means being movable into holding relation with said cam to retain the latter stationary during framing to phase said cam with said film strip.

7. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising a feed sprocket engaging said strip to move the latter toward said platen, a feed shaft on which said sprocket is mounted, means to rotate said shaft and sprocket to feed said strip, said shaft and sprocket being rotated to move one transparency into mounting relation with said mount to frame said one transparency, an indexing member loosely carried by said shaft, clutch means releasably connecting said indexing member in driven relation to said shaft, and means carried by said support and yieldably engaging said indexing member to indicate the proper feeding of said strip by said sprocket to index said strip, said last means being movable into holding relation with said indexing member during the framing of said one transparency to phase said indexing member with said film strip so that subsequent operation of said sprocket will enable said indexing member to indicate the proper indexing of said strip.

8. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising a feed sprocket engaging said strip to move the latter toward said platen, a feed shaft on which said sprocket is mounted, means to rotate said shaft and sprocket to feed said strip, said shaft and sprocket being rotated to move one transparency into mounting relation with said mount to frame said one transparency, an indexing member loosely carried by said shaft, clutch means releasably connecting said indexing member in driven relation to said shaft, and means carried by said support and yieldably engaging said indexing member to indicate the proper feeding of said strip by said sprocket to index said strip, said last mentioned means being movable into holding relation with said indexing member to hold the latter stationary and disconnected from said shaft while said film is being moved for framing so as to phase said indexing member with said strip to enable the indexing member to indicate subsequent indexing of the film strip.

9. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, and means to sever an individual transparency from said strip and to position the severed transparency on said mount, the improvement comprising a feed sprocket engaging said strip to move the latter toward said platen, a feed shaft on which said sprocket is mounted, means to rotate said shaft and sprocket to feed said strip, said shaft and sprocket being rotated to move one transparency into mounting relation with said mount to frame said one transparency, an indexing member loosely carried by said shaft, clutch means releasably connecting said indexing member in driven relation to said shaft, an arm rockably mounted on said support and engaging said cam, and spring means engaging said arm to hold the latter yieldably against said cam so that said cam and arm cooperate to indicate subsequent proper indexing of the film strip, said arm being movable into positive holding relation with said cam to disengage said clutch and to hold the cam stationary during the rotation of said shaft and sprocket during framing to phase said cam with said strip so that said cam and arm will be rendered effective to indicate subsequent movements of said strip to bring successive transparencies into proper mounting position relative to said mount.

10. In a device for mounting pairs of stereo transparencies from a film strip along which said stereo transparencies are arranged, said device having a support, an adjustable platen carried by said support for receiving a stereo mount thereon positionable to receive a pair of stereo transparencies, means to feed said strip intermittently toward said mount, means to sever an individual transparency from said strip and to position the severed transparency on said mount, and means to heat tack a severed transparency in position on said mount, the improvement comprising a shaft rotatably mounted on said support adjacent said film strip, a feed sprocket secured to said shaft and engaging said strip to move the latter toward said mount upon rotation of said shaft, means to rotate said shaft to move said strip toward said mount to frame a transparency of said strip relative to said mount, an indexing cam loosely mounted on said shaft, a clutch for connecting said cam in driven relation to said shaft, an arm rockably mounted on said support adjacent said cam, and spring means to retain said arm in yieldable engagement with said cam to indicate subsequent proper movements of said shaft and sprocket to move the film the required distance to index the film, said arm being movable forceably against said cam to hold the latter stationary and to disconnect the cam from said shaft during framing to phase said cam with said strip, said arm being then released so as to engage said cam yieldably and to cooperate therewith to indicate when the sprocket and shaft have been moved a distance sufficient to move a subsequent transparency into mounting relation with said mount.

11. In a device for mounting pairs of stereo transparencies from a film strip along which the transparencies are arranged, said device having a support, a plate rockably mounted on said support, a film guide on said plate, a rotatable and axially movable platen carried by said support for receiving a stereo mount, said plate being rockable to position said guide adjacent said platen, and means to adjust said platen to position said mount relative to said guide to receive a transparency, the improvement comprising means carried by said plate to move said strip through said guide and toward said platen, means to sever a transparency from said strip, means to mount said severed transparency on said mount, cooperating means on said plate and platen to hold the latter against rotation during the severing of a transparency, film feed means carried by said plate, means to index said strip relative to said mount, and means associated with the feeding means to phase said indexing means relative to said feeding means.

References Cited in the file of this patent
UNITED STATES PATENTS

| | | |
|---|---|---|
| 2,644,562 | Pettus | July 7, 1953 |
| 2,718,975 | Bower | Sept. 27, 1955 |